United States Patent [19]

Fremont et al.

[11] Patent Number: 4,755,305
[45] Date of Patent: Jul. 5, 1988

[54] CONTINUOUS DEWATERING METHOD

[75] Inventors: Henry A. Fremont, Wyoming; William C. Dorman, Hamilton, both of Ohio

[73] Assignee: Champion International Corporation, Stamford, Conn.

[21] Appl. No.: 851,900

[22] Filed: Apr. 11, 1986

Related U.S. Application Data

[63] Continuation of Ser. No. 416,901, Sep. 13, 1982, abandoned, which is a continuation-in-part of Ser. No. 251,219, Apr. 6, 1981, Pat. No. 4,671,874, and a continuation-in-part of Ser. No. 358,002, Mar. 15, 1982, abandoned.

[51] Int. Cl.$^4$ .............................................. C02F 1/46
[52] U.S. Cl. ................................... 210/748; 204/149; 204/DIG. 9
[58] Field of Search ................. 210/748, 243; 204/149, 204/152, 300 R, 302, 304, 305, DIG. 9

[56] References Cited

U.S. PATENT DOCUMENTS

| | | |
|---|---|---|
| 565,706 | 8/1896 | Summers et al. . |
| 923,327 | 6/1909 | Burton . |
| 1,198,867 | 9/1916 | Nodon . |
| 1,403,822 | 1/1922 | Van Der Notte . |
| 1,850,808 | 3/1932 | Redd . |
| 1,878,235 | 9/1932 | Gartner et al. . |
| 1,920,239 | 8/1933 | Boyarte et al. . |
| 2,161,049 | 6/1939 | Hartsman . |
| 3,092,536 | 6/1963 | Russell . |
| 3,336,220 | 8/1967 | Neidl .......................... 204/304 X |
| 3,356,603 | 12/1967 | Drew . |
| 3,480,529 | 11/1969 | Waltrip ........................ 204/130 |
| 3,611,793 | 10/1971 | Cerf . |
| 3,701,720 | 10/1972 | Fujita et al. . |
| 3,705,847 | 12/1972 | Stiles .......................... 162/192 X |
| 3,726,750 | 4/1973 | Stillings . |
| 3,770,605 | 11/1973 | McCoy ....................... 204/305 X |
| 3,822,204 | 7/1974 | Sako ........................... 210/221.2 |
| 3,899,405 | 8/1975 | Iverson et al. . |
| 3,915,822 | 10/1975 | Vettman . |
| 3,928,155 | 12/1975 | Woodhouse et al. . |
| 3,959,088 | 5/1976 | Sullivan ....................... 204/DIG. 9 |
| 4,101,400 | 1/1978 | Pepping ....................... 210/748 X |
| 4,110,189 | 8/1978 | Kunkle ........................ 204/182.2 |
| 4,132,626 | 1/1979 | Kunkle ........................ 204/301 |
| 4,170,529 | 10/1979 | Freeman ..................... 204/182.2 X |

List continued on next page.

| | | |
|---|---|---|
| 3,962,069 | 6/1976 | Inoue et al. . |
| 3,998,688 | 12/1976 | Fischer . |
| 4,012,319 | 3/1977 | Ramirez ..................... 210/707 |
| 4,033,851 | 7/1977 | Oros ........................... 204/302 |
| 4,043,047 | 8/1977 | Galliker . |
| 4,071,449 | 1/1978 | Ramirez ..................... 210/707 |
| 4,174,279 | 11/1979 | Clark et al. . |
| 4,244,804 | 1/1981 | Moeglich .................... 204/300 R |
| 4,367,132 | 1/1983 | Bell et al. ................... 210/748 X |

OTHER PUBLICATIONS

Excerpts from McGraw Hill Enclclopedia of Science & Technology, pp. 196–170, 599–601, 314, 207, 23, 182, 583, 37, 104, 169, 534, 599, 505, 166, 194–195 and 542–544.

(List continued on next page.)

Primary Examiner—Tom Wyse
Attorney, Agent, or Firm—Evelyn M. Sommer

[57] ABSTRACT

An apparatus and method for dewatering sludges and the like as part of landfill operations by electrokinetic techniques including placing anode and cathode electrode modules in contact with the sludge and applying electrical energy to the electrodes to establish an electric field in the sludge. Charged particles within the sludge, including macro-molecules, colloids, and suspended particles, electrophoretically migrate to the oppositely charged counter electrode and consolidate. A filtration media located at one of the electrodes permits the electro-osmotic removal of water from the sludge to encourage solids densification. The electrical energy applied to the electrodes is a chopped, time-varying, intermittent unidirectional current having a rapid rise edge which provides dewatering results comparable to prior methods that used direct current or full AC current but at substantially reduced energy consumption to provide more economical dewatering. Presently preferred optimum conditions for practicing the invention are also disclosed, including means for applying the techniques of the disclosure to a continuous dewatering method and an apparatus for practicing that method. The application of the electrokinetic techniques to other processes such as electrodialysis, including electrolysis (using a membrane or bipolar membrane), desalinization or metathesis; and electrowinning, including electroplating; and other electrophoretic processes is suggested.

11 Claims, 7 Drawing Sheets

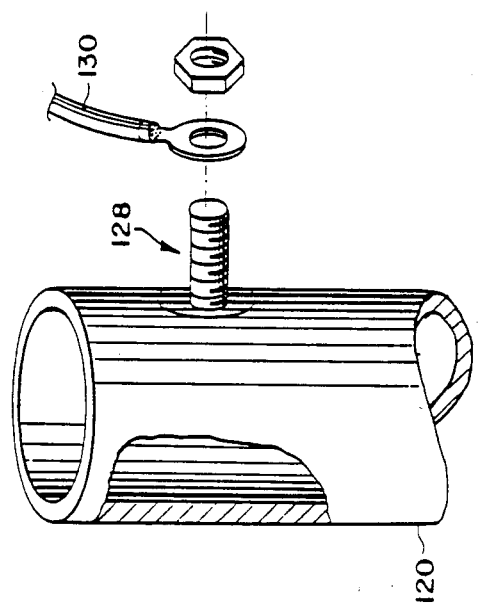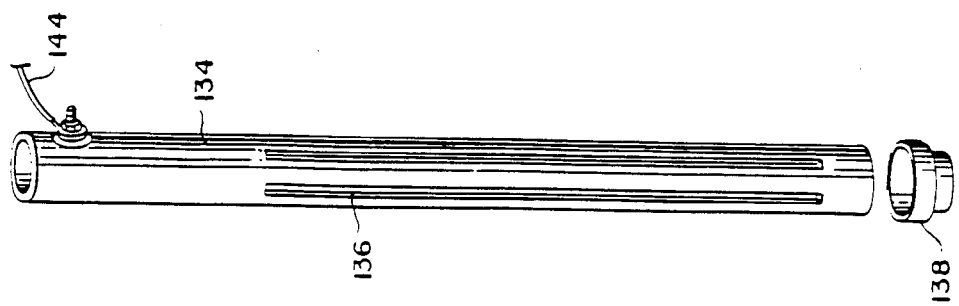

CONTINUOUS DEWATERING METHOD

CROSS REFERENCE TO RELATED APPLICATIONS

This application is a continuation of application Ser. No. 416,901, filed Sept. 13, 1982, abandoned, which is a continuation-in-part application of Ser. No. 251,219, filed Apr. 6, 1981, U.S. Pat. No. 4,671,874 and a continuation-in-part application of Ser. No. 358,002, filed Mar. 15, 1982, abandoned, both by the inventors of this application and assigned to the assignee of the subject improvement.

BACKGROUND OF THE INVENTION

The present invention relates to the dewatering of sludges, slurries, or the like, that contain macro-molecules, colloidal particles, and/or suspended particles in a carrier liquid, usually water, and, more particularly, to dewatering of such materials using electrokinetic techniques including both electrophoretic and electro-osmotic techniques.

In addition, this invention relates to the application of the electrokinetic techniques disclosed to such electrokinetic processes as electrodialysis, including electrolysis, desalinization, and metathesis; and electrowinning; as well as to electrophoretic processes other than the dewatering of sludges and slurries.

Many industries, especially the paper making and related fiber production industries, generate large quantities of sludge or slurry-like effluents that contain various concentrations of materials generically described as "solids" that can include, for example, dispersed and semi-dispersed macro-molecules, colloidal particles, and suspended particulate matter. As part of the treatment of the effluents, the liquid carrier or water is separated from the solids with the so-separated water being recycled to the industrial process or returned to the environment and the solids disposed of through landfill operations.

In the past, the dewatering of effluents to isolate solids has been accomplished by thermal evaporation, mechanical filtration, chemical processing, settling, flotation, and a variety of other methods. In some special cases, electrical dewatering of effluents and sludges has been accomplished by establishing an electric field in the sludge between electrodes immersed within the sludge. As a consequence of the applied electric field, particles within the sludge that carry a net positive or negative charge, including macro-molecules, colloidal particles, and suspended particles, electrophoretically migrate to their respective, oppositely charged, counter electrode. In addition to the migration of the particulate matter, water molecules which are bound to or otherwise associated with some of the charged particles will co-migrate with those particles. As a consequence of this migration of charged particles and associated water molecules, the solid particles consolidate and densify to effect partial separation from the liquid carrier. Filtration devices can be provided at or near one of the electrodes to permit removal of the water by electroosmotic techniques. With continued application of the electric field and water removal, the solids concentration of sludge increases to the point where the solids densify and consolidate into a load-bearing material to complete the dewatering.

The principal economic cost of electrokinetic dewatering has been the cost of electricity for generating and sustaining the applied electric field. In the past, direct current has been applied to the electrodes to establish the electric field. Direct current has the advantage of establishing a uniform field but has the associated disadvantage of not being readily available from power mains and, accordingly, must be generated on site, usually through motor-generator sets. Experience indicates that the dewatering rate, that is, the rate of water removal over time, or conversely, the rate of solids consolidation, is roughly proportional to the power consumed in kilowatt hours (KWH). The economic costs associated with dewatering an acre of sludge as part of a landfill operation are presently between $8500–$9500 (1980 dollars). Accordingly, there is an economic need to effect dewatering by electrokinetic techniques at substantially reduced electrical energy costs.

In addition, there is a continuing need in the art of electrokinetic dewatering to dewater sludges continuously in a rapid, cost-effective manner, in situ, to ease the burden of sludge handling and disposal of material reclamation. In addition, it is desirable to be able to adapt existing conventional continuous sludge conveyances readily to utilize the techniques of this invention. It is toward the solution of these aspects of the problems that this application is directed, as well as to the application of the techniques described in the parent case to a continuous dewatering system.

In addition to the application of the teachings of this invention to electrophoretic dewatering of liquid of the type which includes emulsions, slurries, and solutions, the advantages of the invention are expected to be obtained for the electrophoretic treatment of such compositions as polyvinyl acetate, polyvinyl chloride, and other compounds manufactured, purified or treated using electrophoresis. Thus, it is expected that the application of a time-varying, intermittent, unidirectional current, having the wave form here described, to cathode and anode electrodes minimizes the consumption of power in electrophoretic processes experiencing the phenomenon of migration of suspended or colloidal particles in a liquid due to an emf or potential applied to the electrodes.

In addition to its application to electrophoretic processes, it is expected that the invention may also be used with processes using electrodialysis and electrowinning. Examples of types of electrodialysis processes to which the invention can be applied are processes using electrolysis, whether using a membrane process or a bipolar membrane, such as in the manufacture of chlorine or chlorination processes; desalinization processes, especially those using a membrane; and metathesis processes. An example of metathesis is the typical reaction: 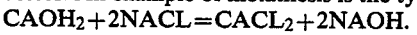
$CAOH_2 + 2NACL = CACL_2 + 2NAOH$.

Electrolysis or electrolytic conduction, for purposes of the application of the teachings of this invention, can be considered to be the conduction of electricity accompanied by the actual transfer of matter, i.e. migration of ions, which is shown by the occurrence of chemical changes at the electrodes.

Electrowinning is the recovery of metals from ores by electrochemical processes and is also known as electro-extraction. In particular, such processes involve the recovery of a metal from a solution of its salts by passing an electrical current through the solution. Electrowinning is thus a common process for extracting metal from its ore. Electrowinning processes may also involve electroplating which is the production of a thin coating of one metal on another by electrodeposition by making the respective metals the anode and cathode in an electrolytic cell containing a solution of a salt of the metal to be deposited.

Thus, it is believed that to minimize the power consumption the invention can be applied to a wide variety of processes which conventionally have used direct current to perform the process to achieve an electrokinetic treatment of matter.

SUMMARY OF THE INVENTION

It is an object of the present invention to provide a method for efficiently dewatering solids-containing sludges, slurries, and the like, by electrokinetic techniques.

It is another object of the present invention to provide a method of dewatering solids-containing sludges, slurries, and the like, by consolidating the solids portion thereof by electrophoretic techniques and by removing the water portion thereof by electro-osmotic techniques.

It is another object of the present invention to provide a method of dewatering solids-containing sludges, slurries, and the like, by consolidation of the solids fraction and removal of the water fraction in an energy efficient manner.

It is still another object of the present invention to provide a method of dewatering solids-containing sludges, slurries, and the like, using electrokinetic techniques in which the energy used is generally one-quarter of the energy required by prior methods to obtain similar dewatering results.

It is still another object of the present invention to provide an apparatus for efficiently dewatering solids-containing sludges, slurries, and the like, by electrokinetic techniques in which the apparatus is both simple to operate and energy efficient.

It is still another object of the present invention to provide an apparatus for dewatering solids-containing sludges, slurries, and the like, in which the apparatus may be conveniently used for dewatering sludge ponds as part of the landfill operation.

It is an overall object of the first improvement application to apply the foregoing techniques to a process for continuously dewatering and densifying sludge on a continuous basis and to provide an apparatus therefor.

It is another object of that improvement to provide an apparatus which is readily adaptable to existing sludge conveyors to apply the dewatering techniques of this invention in an easy, convenient manner.

It is an overall object of ths second improvement application to suggest the application of the foregoing electrokinetic techniques to other electrokinetic processes such as electrodialysis, including electrolysis, desalinization, and metathesis; electrowinning; and to electrophoretic processes other than the dewatering of sludges and slurries.

It is another overall object of this second improvement application to provide a method for electrokinetically treating a liquid from a group consisting of emulsions, slurries, and solutions to minimize electrode polarization and thereby maximize effective use of the applied power in electrophoretic, electrodialysis, and electrowinning processes, by applying a time varying, intermittent unidirectional electrical current to the cathode and anode electrodes to establish an electrical field therebetween in the liquid, the electrical current having a wave form which includes a switching edge at a selected phase angle to cause charged matter within the liquid of the process to migrate to respective oppositely charged electrodes and continuing the process to complete the electrokinetic treatment with a minimized consumption of power.

In accordance with the present invention, a method for dewatering solids-containing sludges, slurries, and the like, including the placing of electrodes, viz., anodes and cathodes, within the sludge and applying electrical energy of a selected wave form to the electrodes to establish an electrical field through the sludge. Particles within the sludge carrying a net positive or negative electrical charge such as macro-molecules, colloidal particles, and suspended particles, as well as water molecules that are bound to or associated with certain ions, are caused to electrophoretically migrate to the respective, oppositely charged, counter electrode. The desired electrical field is produced by applying electrical energy to the electrodes in the form of alternating current wave forms in which the wave form is rectified to provide an intermittent unidirectional current pulse or a "chopped" wave form, preferably having a rapid rise time leading edge. Filtering media operate in cooperation with that electrode to which the water molecules migrate to remove a water filtrate permeate from the sludge to further enhance consolidation and densification of the solids.

In accordance with the disclosure of this second improvement application, the method may be applied to electrokinetic processes other than the electrokinetic dewatering of liquids of the type originally disclosed. Thus, the advantages of the invention are expected to be obtained by the application of a time varying intermittent unidirectional current to the cathode and anode electrodes which establish an electrical field therebetween in the liquid wherein the electrical current has a wave form which includes a switching edge at a selected phase angle to cause charged matter within the liquid to migrate to respective oppositely charged electrodes. Such a wave form may be applied to other electrokinetic processes to minimize electrode polarization and thereby maximize the effective use of the applied power by minimizing the consumption of power. Examples of other electrokinetic processes to which the treatment may be applied include electrodialysis process, including electrolysis (whether membrane or bipolar membrane processes), desalinization, and metathesis, and electrowinning processes, and electrophoretic processes other than dewatering. An example of the latter is the application of such electrophoretic techniques in the manufacture of polyvinyl acetate and polyvinyl chloride.

Apparatus for effecting the method includes a plurality of anode and cathode electrodes mounted in a selected pattern on an electrode module that is designed to float upon the sludge to be dewatered and suspend the electrodes within the sludge. The electrodes to which the water molecules migrate include a filter covering and an attached pumping system to remove water that passes through the filter to effect the dewatering. Electrical circuitry for applying the "chopped" wave form or intermittent unidirectional current pulse to the electrodes includes selectively gated thyristors, such as SCR's, with the thyristors gated at a selected phase angle in the alternating current cycle to provide a "chopped" pulse having a sharp leading edge.

Apparatus for effecting the method on a continuous basis includes means for continuously feeding sludge into an open headbox disposed above a moving filter belt driven by rollers moving through the electrokinetic dewatering zone. An adjustable dam may be provided to maintain the sludge level. A vacuum box provides a vacuum to aid the removal of the permeate which passes through the filter onto a slotted rubber support belt. A belt washing system and means for extracting sludge cake at the finishing end of the process may also be provided. Preferably, the anode assembly is provided in the interior of an upper filter belt while the cathode assembly is provided at the interior of a lower filter belt to define a dewatering zone between them, the electrodes being arranged so that an electric field is established therebetween to achieve the electrokinetic dewatering. In the alternative, the cathode can be made a part of the moving belt.

The method and apparatus provide dewatering and concomitant solids consolidation commensurate with or superior to prior methods and apparatus but at substantially reduced energy consumption rates and accordingly provides a significant economic advantage when compared to prior systems.

The exact mechanism by which the use of intermittent unidirectional current to generate the applied electric field effects efficient dewatering is not entirely known. In prior electrokinetic dewatering arrangements, in which DC was used to generate the applied electric field to the sludge, it is possible that the positively and negatively charged particles accumulate in zones or regions immediately adjacent to their respective oppositely charged counter electrodes and form a "cloud" of similarly charged particles that may repel additional particles from joining the "cloud" and effectively screen the electrode from slurry. This effect is commonly known as electrode polarization. In the case of the present invention, it is believed that the chopped wave form or intermittent unidirectional current or "chopped" pulse of the applied electrical energy may limit formation of this accumulation of otherwise repelling charged particles. In any event, the results achieved have been more cost effective than prior techniques.

BRIEF DESCRIPTION OF THE DRAWINGS

The above brief description, as well as further objects, features, and advantages, of the present invention will be more fully appreciated by reference to the following detailed description of presently preferred but nonetheless illustrative embodiments when taken in conjunction with the accompanying drawings wherein:

FIG. 6 is a detailed elevational view of one of the cathodes shown in FIG. 5;

FIG. 7 is a detailed description of a filtrate sock that normally covers a cathode;

FIG. 8 is a detailed view from FIG. 4 showing the manner by which electrical connection is made with the electrodes;

FIG. 13 is a side illustration, drawn partially schematically, of an apparatus for providing continuous electrokinetic dewatering by continuously conveying sludge through a dewatering zone;

FIG. 14 is a more detailed view of the apparatus of FIG. 13 to illustrate in perspective, the detail of an apparatus for practicing the continuous electrokinetic dewatering according to the invention and the application of such techniques to existing sludge conveyors;

FIG. 15 is a top perspective view of the cathode assembly in a rubber support belt for alternative use in the apparatus of FIGS. 13 and 14;

FIG. 16 is a side perspective view of the moving electrical contact assembly for the cathode of FIG. 15;

FIG. 17 is a circuit diagram similar to FIG. 11 for supplying power to either the batch or continuous systems;

FIG. 18 is a diagram of wave forms taken at various points of FIG. 17; and

FIG. 19 is a simplified block diagram of other electrokinetic processes to which the invention may be applied, according to the teachings of this second continuation-in-part application.

DETAILED DESCRIPTION OF THE PREFERRED EMBODIMENT

Figure 1:
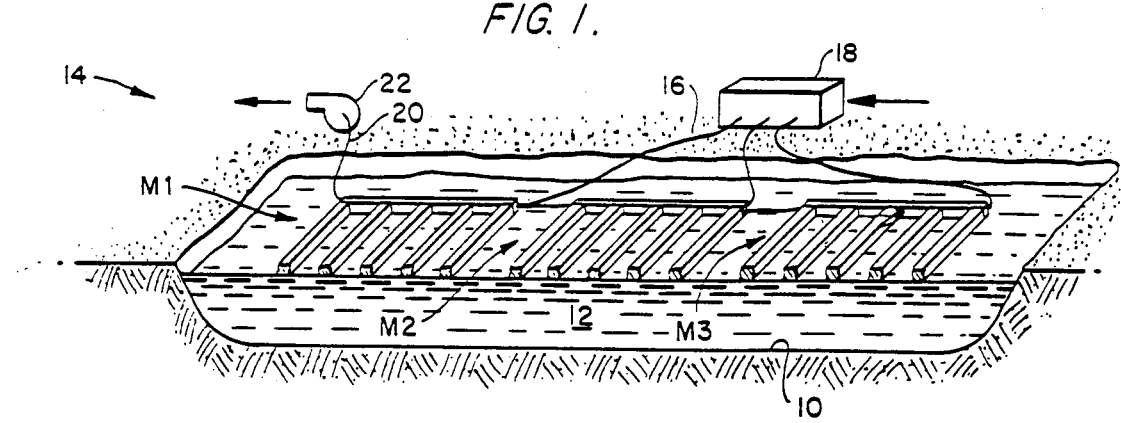
FIG. 1 is a schematic perspective view, in cross section, of an exemplary landfill operation using the apparatus and method of the present invention to effect dewatering of a sludge pond.

The dewatering method and apparatus of the present invention may be utilized, as shown in FIG. 1, for dewatering sludge at a landfill site so that the solids within the sludge consolidate and densify sufficiently to support a covering layer of earth. As shown in FIG. 1, a pit or depression 10 is excavated in the earth and filled to a selected level with a solids-containing sludge 12 to thereby define a sludge pond 14. In the alternative, the pond 14 may be formed without excavation by enclosing a selected area with earthen dikes and filling the so-called area with the sludge 14.

The sludge to be dewatered is typically a fluid-pumpable mixture of water and solids with these solids including macro-molecules, colloidal particles, and suspended particles. These types of sludge are characteristically produced by the paper making and related fiber production industries.

Electrode modules M1, M2, and M3 are located in the pond 14 and are designed to float on the sludge surface 12 as described more fully below. The modules M1, M2, and M3 are spaced a selected distance from one another by spacing members (not shown) with the total number of modules M required to dewater the pond 14 proportional to the overall surface area of the pond. As described more fully below, each electrode module M includes a plurality of anodes and cathodes (not shown in FIG. 1) that are secured to their respective modules and extend generally vertically downwardly into the sludge 12. The various anodes and cathodes are connected by respective electrical conductors 16 to a power source 18 which is designed, as described below, to apply an electrical potential to the anodes and the cathodes to establish an electric field between the respective oppositely poled electrodes and thus through the sludge 12. The cathodes are provided with filtering media to remove water from the sludge through a fluid conduit 20 that extends along and between each of the modules M and conducts filtrate to a water removal pump 22 for subsequent discharge or disposal. In time, the level of the sludge 12 in the pond will drop as the solids concentration increases to the point where the dewatered sludge has substantial load bearing capacity, at which time, the modules M1–M3 are removed and the solidified sludge 12 covered with a layer of earth to complete the landfill operation.

Figure 2:
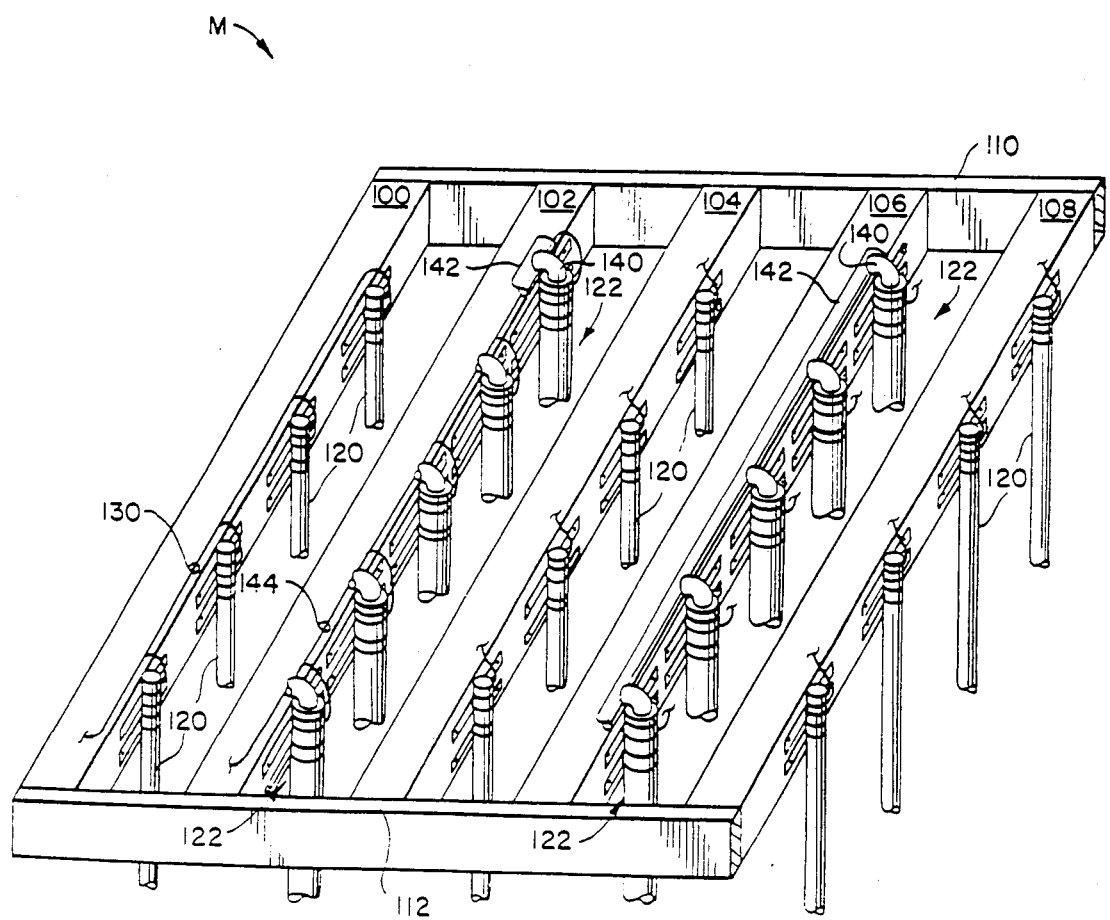
FIG. 2 is a schematic, perspective view of an electrode module for establishing an electric field within the sludge pond shown in FIG. 1.
Figure 3:
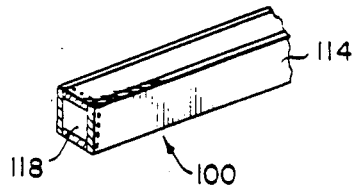
FIG. 3 is a partial perspective view of an electrode support float used in the module shown in FIGS. 1 and 2.
Figure 3A:
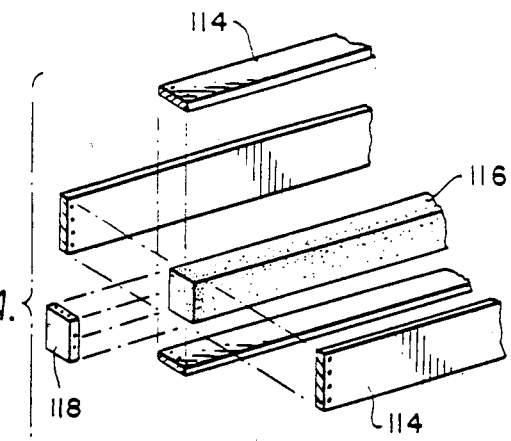
FIG. 3A is an exploded perspective view of the electrode support float shown in FIG. 3.

An exemplary electrode module M is shown in FIG. 2 and includes five electrode support floats 100, 102, 104, 106, and 108 that are secured in a spaced parallel relationship to one another by end plates 110 and 112. In the preferred embodiment, the electrode support floats 100–108 and the end plates 110 and 112 are fabricated from construction-grade wood members with the floats, as shown in detail in FIGS. 3 and 3A, fabricated from 1"×8"×16' boards 114 secured together about a styrofoam floatation block 116 with end caps 118 provided to seal the ends of each of the electrode support floats. The end plates 110 and 112 that secure the electrode support floats 100–108 together to complete each electrode module M are also preferably 2"×8"×16' boards. Accordingly, each electrode module M has 16'×16' overall dimensions.

Figure 4:
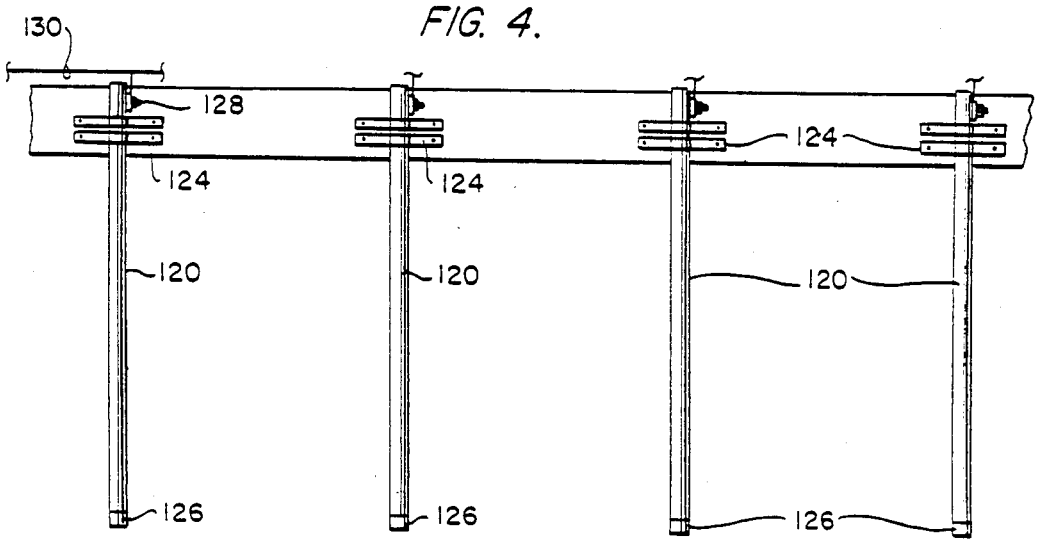
FIG. 4 is a side elevational view of anode support float with four anodes secured to and depending from the support.
Figure 5:
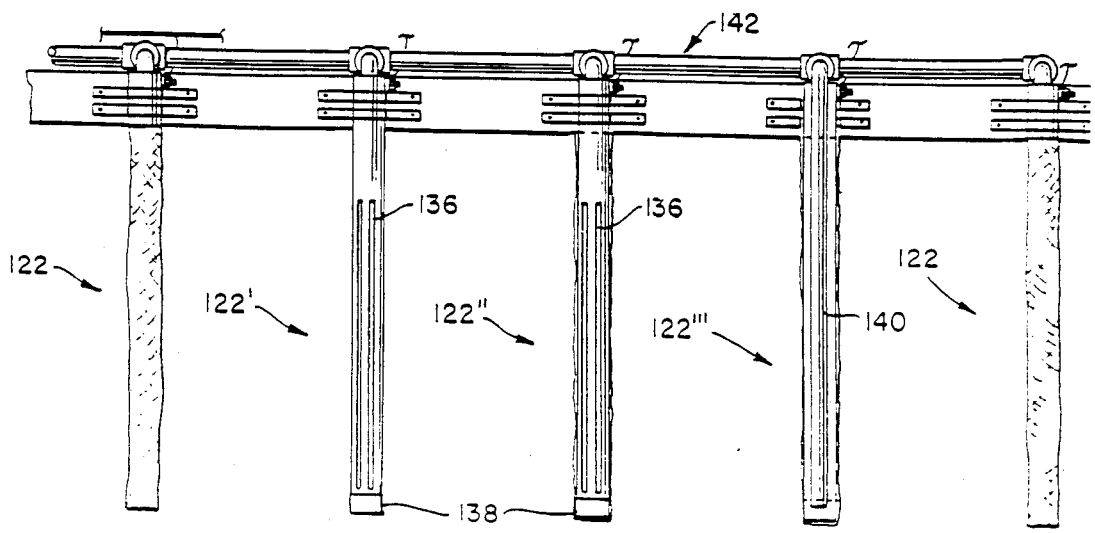
FIG. 5 is a side elevational view of a cathode support float with five cathodes secured to and depending from the float.

The electrode supports 100, 104, 108 serve as supports for the anodes 120 as shown in further detail in FIG. 4, and the intermediate electrode support floats 102 and 106 serve as supports for the cathode assemblies 122 as shown in further detail in FIGS. 5–7.

The electrode support floats 100, 104, and 108 each include four equi-spaced anodes 102. In the preferred form, each anode 120 is a schedule 40 carbon steel pipe (2" inside diameter) approximately 6' long and secured at its upper end by securing straps 124, brackets, or the like, to the side of its respective float. An end cap 126 is located at the lower end of each anode 120 to seal the interior of the anode. As shown in FIG. 8, a threaded stud 128 is secured as by welding to the upper end of each anode 120 and serves as a terminal for connection to a power carrying wire 130. In FIG. 2, only the anodes 120 on the electrode support float 100 are shown connected by the conductor 130, it being understood that each of the anodes 120 on the two other anode electrode supports floats 104 and 108 are likewise interconnected by conductors 130 from the three anodes electrode support floats 100, 104, and 108 connected to a common anode conductor (not shown) that passes through the power cable 16 to the power supply 18 (FIG. 1).

As shown in FIG. 2, the cathode assemblies 122 are secured to the electrode support floats 102 and 106 intermediate the anode support floats 100, 104, and 108. Each cathode assembly 122 is designed to both function as an electrode and as a filtrate removal device. Each cathode assembly 122 includes an outer filtration bag or sock 132 (see FIG. 7) in the form of a hollow, elongated woven fabric tube closed at its lower end and woven from, e.g. a polyester or like material or fabricated from a non-woven material such as Dupont Typar. The sock 132 is drawn up and over a cathode pipe 13 (FIG. 6) which, in the preferred embodiment, is a schedule 10 carbon steel (4" inside diameter) 6' long pipe secured at its upper end to its respective electrode support float in a manner similar to that for the anodes 120 discussed above. In FIG. 5, an exterior view of a cathode assembly 122 with its filtration sock 132 in place on the cathode pipe 134 is shown on the left and right of the figure, a cathode assembly 122 with its filtration sock 132 shown in cross section is referred to by the reference character 122", and a cathode assembly 122 with both its filtration sock 132 and cathode pipe 134 shown in cross section is referred to by the reference character 122'''.

As shown in FIG. 5 reference characters 122' and 122") and in FIG. 6, each cathode pipe 134 has preferably three equally spaced, longitudinally aligned slots 136 formed in the wall of the cathode pipe 134. Preferably, each of the slots 136 terminates adjacent the ends of the pipe 134 with the lower end of each cathode assembly being terminated by a suitable pipe cap 138. A coaxially aligned water removal tube 140 (see cathode assembly 122''' in FIG. 5) extends into the interior of each of the cathode assemblies 122 with the lower open end of each water removal tube 140 positioned adjacent the lower end of the cathode pipe 134. The upper end of each of the water removal tubes 140 is connected to a header pipe 142 that runs the length of each cathode assembly electrode support float 102 and 106 with the header pipes 142 communicating with a common manifold (not shown), which in turn, connects through the conduit 20 to the water removal pump 22 (FIG. 1). A suction pressure is established at the inlet of each water removal tube 104 by the operation of the pump 22 to remove collected water as described more fully below.

In a manner analogous to the electrical connection shown in FIG. 8 for the anodes 120, each of the cathode pipes 134 also includes a threaded stud 128 secured to its upper end used for effecting connection to a cathode wire 144. In FIG. 2, only the cathode assemblies 122 on the electrode support float 102 are shown connected by the conductor 144, it being understood that each of the cathode assemblies 122 on the other cathode electrode support float 106 is likewise interconnected by a conductor 144, with each of the conductors 144 from the two cathode electrode support floats 102 and 106 connected to a common cathode conductor (not shown) that passes through the power cable 16 to the power supply 18 (FIG. 1).

Figure 9:
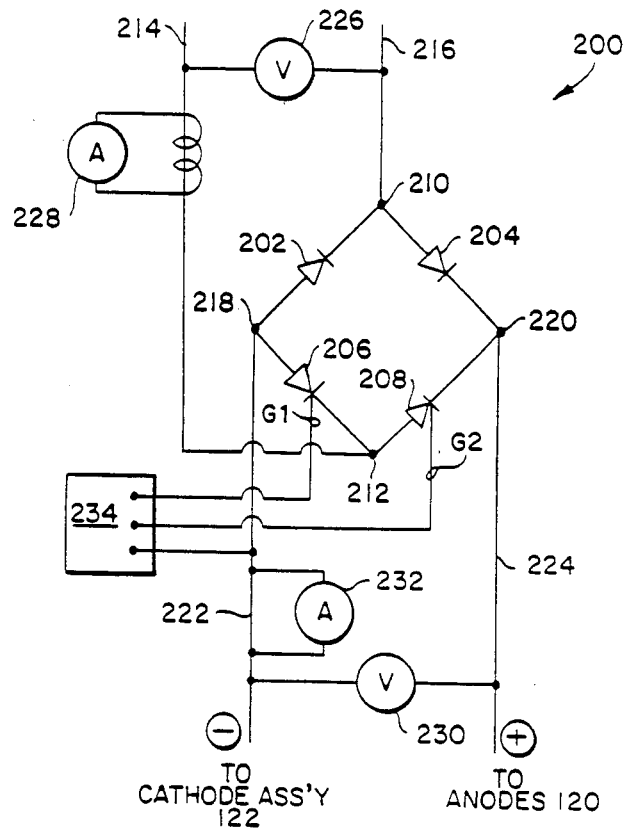
FIG. 9 is an electrical schematic diagram of a circuit for full wave rectification of alternating current to supply an intermittent unidirectional current or "chopped" pulse to the electrode modules of FIG. 1.
Figure 10:
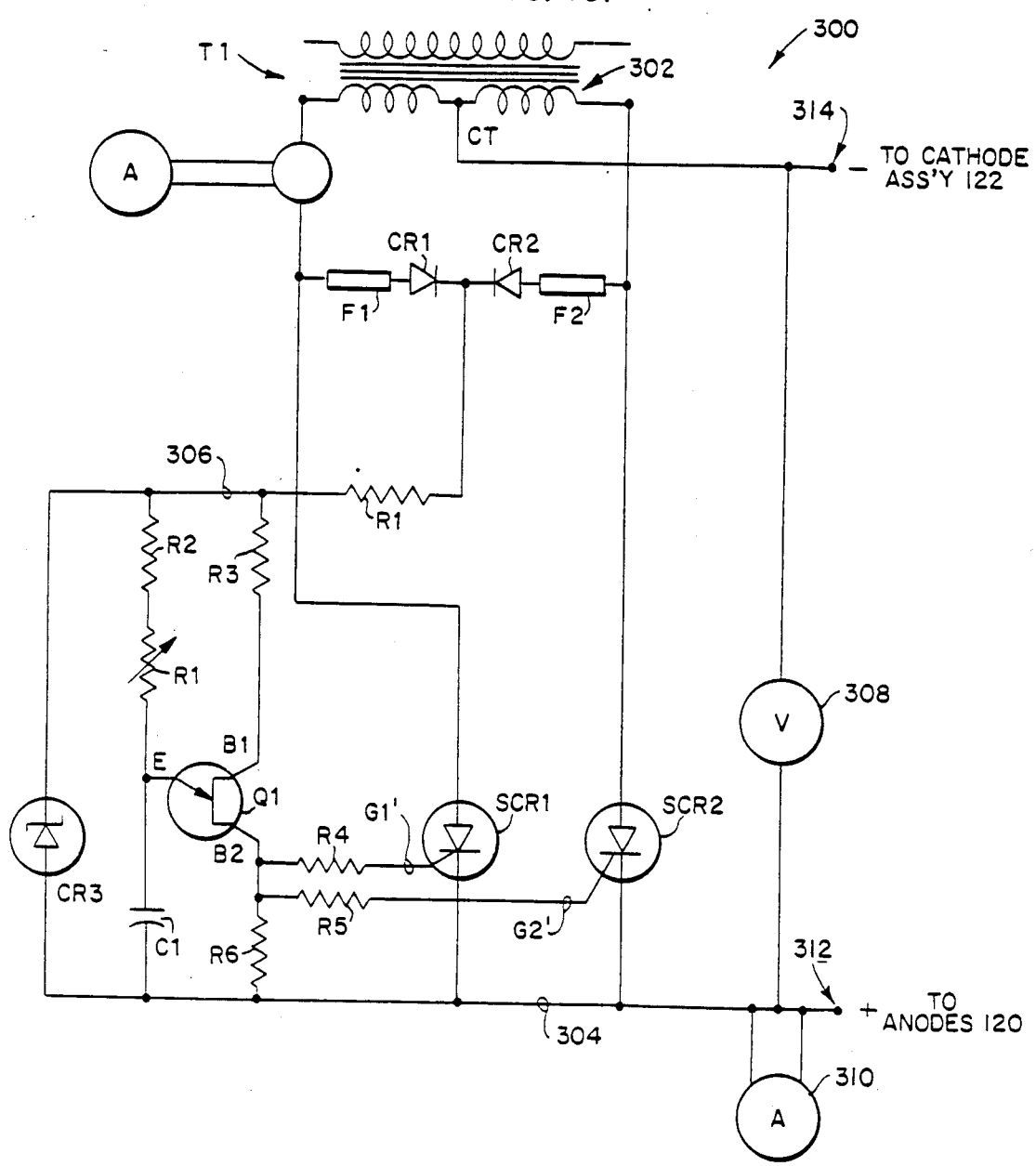
FIG. 10 is an electrical schematic diagram of an alternate electrical circuit for supplying intermittent unidirectional current or "chopped" pulse to the electrode modules of FIG. 1.

Suitable power supply 18 (FIG. 1) circuits for applying a chopped alternating current to the anodes 120 and cathode assemblies 122 of the electrode modules M to establish an electric field through the sludge 12 are shown in FIGS. 9 and 10. In FIG. 9, the power supply circuit 200 includes rectifier diodes 202, 204, 206, and 208 connected in a conventional full wave bridge configuration with main power applied to points 210 and 212 from power mains 214 and 216 and with output power removed from points 218 and 220 respectively along output lines 222 (ground) and 224 (positive), respectively. A volt meter 226 and an ammeter 228 are connected to the power mains 214 and 216 to monitor input power and, likewise, another voltmeter 230 and ammeter 232 are connected to the output lines 222 and 224 to measure output power applied to the electrode modules M.

Figure 9A:
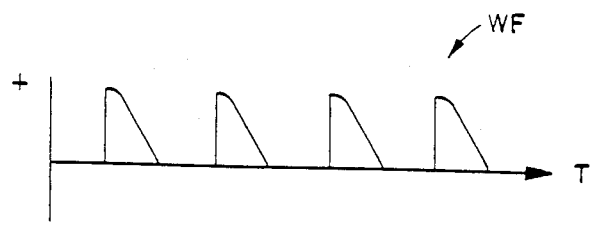
FIG. 9A is a graphical representation of the profile of the intermittent unidirectional current or "chopped" pulse provided by the circuit of FIG. 9.

The diodes 206 and 208 are silicon controlled rectifiers (SCR's) with respective gate terminals G1 and G2 of the diodes, connected to an SCR triggering circuit 234. The triggering circuit 234 operates to control the gating of the silicon controlled rectifiers 206 and 208 to selectively gate them at a selected firing angle on each successive alternation of the power to provide a wave form WF shown in FIG. 9A. The wave form WF includes a steep leading edge that occurs upon successive triggering of the SCR diodes 206 and 208 and a conventional sinusoidal trailing edge. As is conventional in the art, the triggering circuit 234 may take the form of a resistor/capacitor series circuit with the connection between the resistor and the capacitor connected to the gates of the SCR's 206 and 208 with the firing angle controlled by control of the resistance value.

Another power supply circuit 300 for also providing a chopped alternating current wave form to the electrode modules is shown in FIG. 10 and includes a transformer T1 having a center tapped secondary 302 with the center tap CT establishing a ground potential. The terminal ends of the secondary 302 are connected to the positive output line 304 through silicon controlled rectifiers SCR1 and SCR2. The firing angle of the silicon controlled rectifiers SCR1 and SCR2 is controlled through a firing circuit that includes a uni-junction transistor Q1. The emitter of the transistor Q1 is connected to a series RC circuit that includes an adjustable resistor R1, a fixed resistor R2, and a capacitor C1 connected between the positive output line 304 and a bias supply line 306 with the bias supply line held at a constant voltage by the zener diode CR3. The base connections of the uni-junction transistor Q1 are connected between the positive output line 304 and the bias supply line 306 through resistors R3 and R6. The base terminal B2 of the transistor Q1 is connected through resistors R4 and R5 to the gate terminals G1' and G2' of the silicon controlled rectifiers SCR1 and SCR2, respectively. The bias potential on bias supply line 306 is supplied through a limited resistor R1 by diodes CR1 and CR2 connected through fuses F1 and F2 to the terminal ends of the secondary 302. A voltmeter 308 and an ammeter 310 are provided to measure output power consumed in establishing the dewatering electric field in the sludge 12.

Figure 10A:
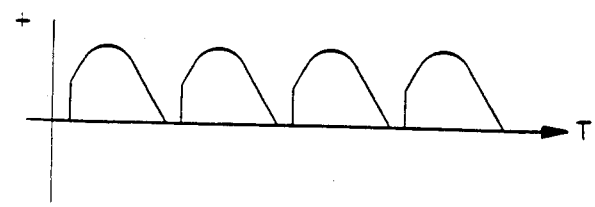
FIG. 10A is a graphical representation of the intermittent unidirectional current or "chopped" pulse provided by the circuitry of FIG. 10.

The wave form WF' produced at output terminals 312 and 314 of the circuit of FIG. 10 is shown in FIG. 10A. As shown therein, successive alternations include a sharp leading edge with the conduction angle controlled by the resistor R1. Depending upon the adjusted valve of the resistor R1, the capacitor C1 charges to a voltage sufficient to cause the uni-junction transistor Q1 to switch thereby permitting current flow through the resistors R4 and R5 to effect gating the silicon controlled rectifiers SCR1 and SCR2. In the preferred embodiment, Q1 is a 2N2646 transistor, the SCR's are G.E. C180E diodes, and the diodes CR1 and SR2 are SK 3484 diodes, the zener CR3 is an SK 3751 diode, and the capacitor C1 has a 0.2 mfd. value.

In operation, the power supply circuits of FIGS. 9–12 are used to apply a positive potential to the anodes 120 and a negative potential to the cathode assemblies 122. When the electrode modules M1–M3 are in position as shown in FIG. 1, an electric field will be generated through the sludge 12 between the various anodes 120 and cathode assemblies 122. As is also known in the art, solids-containing sludges include macro-molecules, colloidal particles, and suspended particles that have a net positive or net negative charge. In addition, sludges can contain ions including metallic ions that associate with water molecules. In response to the application of the applied electric field, positively charged particles will migrate toward the negative cathode assemblies 122, and in a converse manner, negative charged particles will migrate to the positively charged anodes 120 with the solids densifying. While the respective positive and negative particles are migrating, the liquid carrier passes through the filter sock 134 of each cathode assembly 122 and through the slots 136 of each cathode pipe 134. The liquid carrier, that is, water, collects at the bottom of the cathode pipes 134 where it is removed through the water recovery tubes 140 with the necessary suction provided by the pump 22 (FIG. 1).

With continued operation of the system, the percentage solids concentration increases to the point where the solids densify and consolidate to provide a load supporting surface. At this point, the modules M may be removed from the consolidated sludge 12 and a covering layer of earth placed over the sludge layer to complete the landfill operation.

Figure 11:
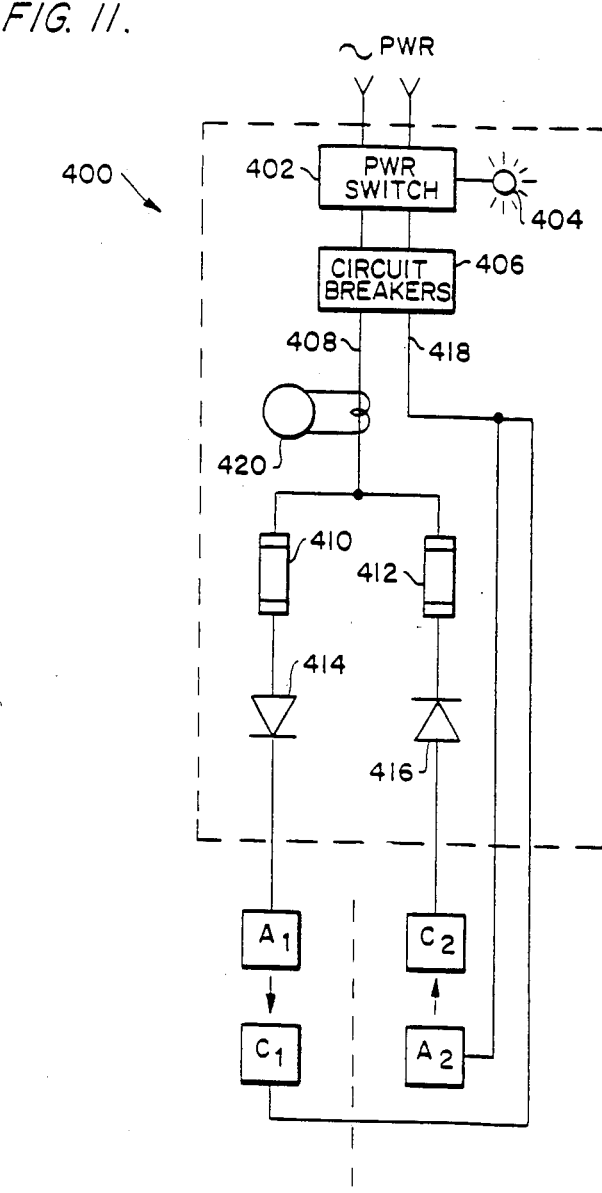
FIG. 11 is an electrical schematic diagram of an alternative electrical circuit for supplying one-half wave rectified alternating current to the electrodes of FIG. 1, if the two fields of electrodes can be separated by a large resistance, i.e. distance to prevent cross electric field shorting.

Another power circuit for providing a wave form to the electrode modules is shown in FIG. 11 and includes a power switch 402 and associated "power on" lamp 404 for connection to the power source and a protective circuit breaker 406. A power line 408 is connected through fuses 410 connected to the diode 414 and the fuse 412 connected to the cathode of the diode 416. The cathode of the diode 414 is connected to the anodes (schematically illustrated as $A_1$) of one of the modules while the anode of the diode 416 is connected to the cathodes (as schematically illustrated as $C_2$) of another module. The respective counter electrodes, that is, cathode $C_1$ and anode $A_2$ are connected through the return power line 418 to the circuit break 406. An amp meter 420 is coupled to the line 408 to measure current flow. Each set of electrodes $A_1$–$C_1$ and $A_2$–$C_2$ establishes an electric field therebetween to effect the desired dewatering. In order to avoid cross-field shorting, it is desirable that the electrodes that define two fields be separated by an electrically significant distance.

Figure 11A:
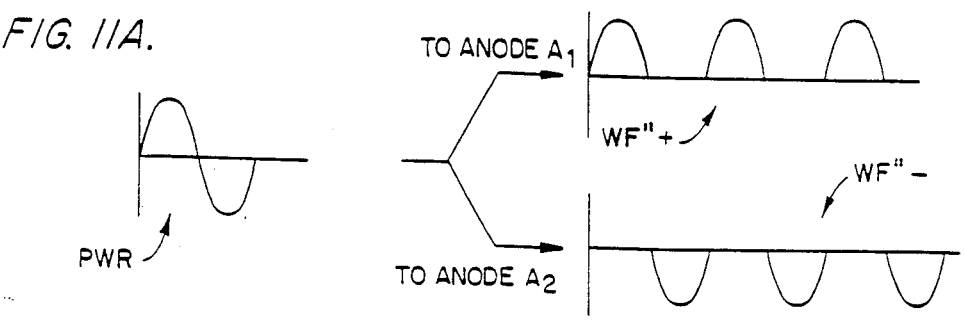
FIG. 11A is a graphical representation of the rectified wave form provided by the circuitry of FIG. 11, to yield an intermittent unidirectional current.

In operation, alternating current, as represented in FIG. 11A, is applied through the fuses 410 and 412 with the diode 414 passing the positive alternations WF"+ and the diode 416 passing the negative alternations WF‴−.

Figure 12:
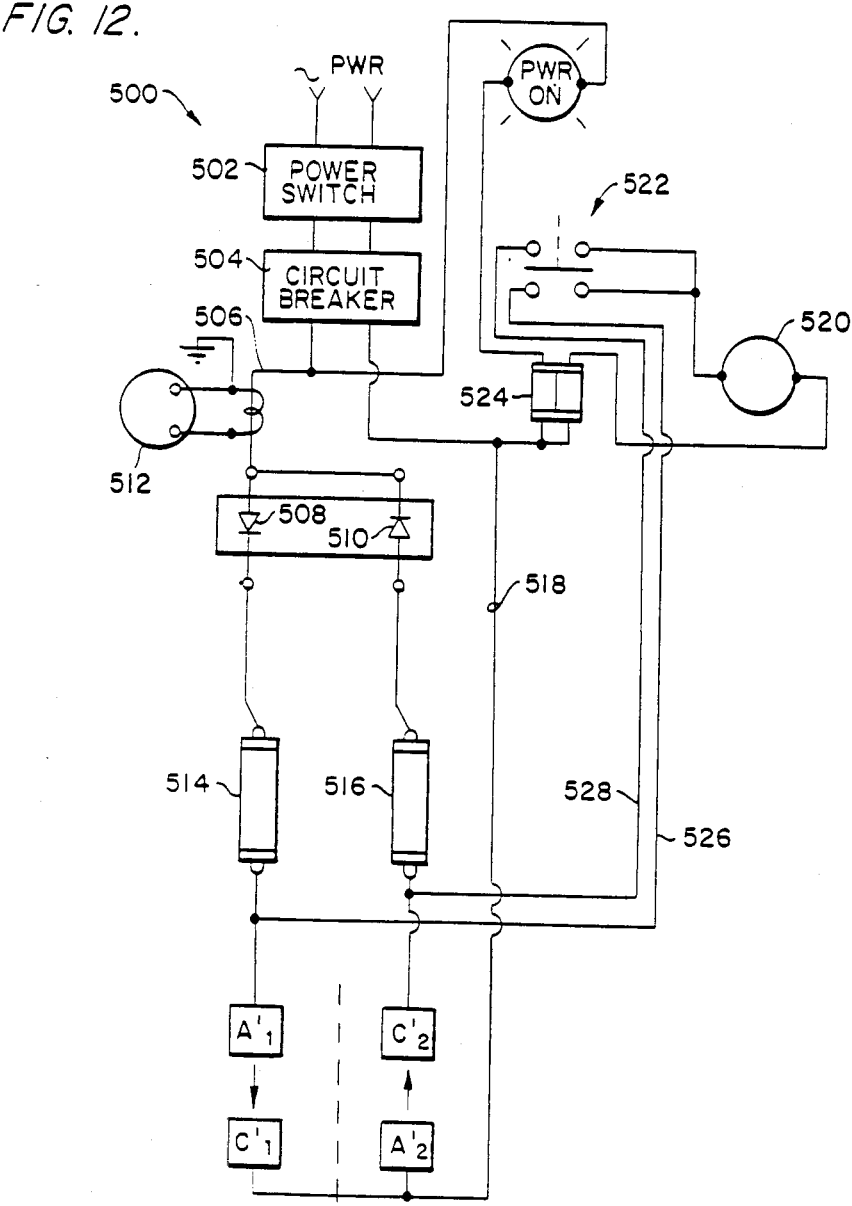
FIG. 12 is an electrical schematic diagram of an alternate electrical circuit for supplying one-half wave rectified alternating current ot the electrode modules of FIG. 1, it the modules cannot be separated by a large resistance.

Another power circuit 500 for providing a wave form to the electrode modules is shown in FIG. 12 and includes a power switch 502 and circuit breaker 504 which provides supply power through a line 506 to diodes 408 and 510 with an amp meter 512 coupled to the line 506 between the circuit breaker 504 and the diode 508 to effect current measurement. The cathode of the diode 508 is connected through a fuse 514 to the anodes of a first electrode module as indicated at $A'_1$ while the anode of the diode 510 is connected through a fuse 516 to the cathodes of another electrode module as indicated by $C'_2$. The respective counter electrodes, that is, cathodes $C'_1$ and $A'_2$ are connected through a common return line 518 to the circuit breaker 504. A bidirectionally responsive volt meter 520 is connected through a double-pole double-throw switch arrangement 522 and fuses 524 to the return line 518 and the electrodes $A'_1$ $C'_2$ through lines 526 and 528, respectively. When the switch 522 is in a first position, the volt meter 520 is connected to the electrode set $A'_1$-$C'_1$ to measure the applied electric voltage potential, and, when the switch 522 is in a second position, the volt meter 520 is connected to the electrode set $A'_2$-$C'_2$ to measure the voltage potential across the latter electrode set.

Figure 12A:
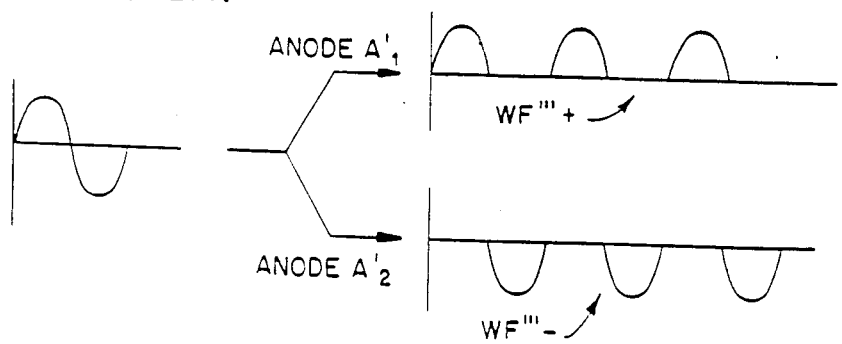
FIG. 12A is a graphic representation of the rectified AC wave form provided by the circuitry of FIG. 11, to yield an intermittent unidirectional current.

The circuit of FIG. 12 operates in a manner similar to that of FIG. 11 in that alternating current wave form, as shown in FIG. 12A is presented to the diodes 508 and 510 with the diode 508 passing positive alternations WF‴+ to the electrode set $A'_1$-$C'_1$ and the diode 510 passing negative alternations WF‴− to the electrode set $A'_2$-$C'_2$.

In the case of the electrode modules of FIG. 11, the field direction for the electrodes $A_1$-$C_1$ is opposite that for the electrodes $A_2$-$C_2$ and, as similarly shown in FIG. 12, the field orientation for the electrodes $A'_1$-$C'_1$ is opposite that for the electrodes $A'_2$-$C'_2$. Since the adjacent fields are oppositely oriented in the two figures, it is desirable that the fields established by the electrode sets be sufficiently separated to prevent cross-field current leakage or shorting. This separation is schematically represented in FIGS. 11 and 12 by the vertical broken line between the electrode sets.

The efficacy of the above-described system may be appreciated by considerations of the following two examples:

EXAMPLE I

The electrode modules were installed in a sludge pond that contained sludge with an average concentration of approximately 9% solids. The sludge had an initial conductivity of $10^3$ micromhos per centimeter with the conductivity increased by a factor of six because of the addition of lime to the surface of the sludge for odor control. The system operated over a period of 40 days with the average solids level measured at a depth of 3 feet increasing from 9% to 27% with a decrease in pond level of about 22″ and 24″. During this period, approximately 75,000–86,000 gallons of water filtrate were removed with the water having a solids concentration of approximately 500 ppm. The total power consumed during the dewatering operation was 3100 kilowatt hours with each wave form switched at an approximately 90° phase angle. The power consumed is approximately one-fourth of the power that would usually be consumed if using direct current in an operation of this type.

EXAMPLE II

Four electrode modules were installed in another sludge pond that contained sludge with an average concentration of 4–7%. The system operated for 40 days with the solids concentration at a 3 foot depth increasing from 4–7% to 25% despite 7″ of rainfall and continued lime spraying operations for odor-suppression. Approximately 143,000–150,000 gallons of filtrate were removed from the site which had an effective electrical field area of about 4200 ft$^2$. At the completion of the trial, solids at the depth of 3 feet were approximately 25–27% with wave form switching occurring at approximately 90%.

Experience indicates that comparable dewatering using direct current consumes about four times as much electrical power in kilowatt hours than was consumed in Examples I and II above. The exact mechanism by which this improved dewatering efficiency is achieved using intermittent unidirectional current or "chopped" pulses is not known but, as discussed above, it may be related to the lack of formation of a zone of accumulated charged particles adjacent the electrodes, which zone would normally screen the electrodes from the sludge and limit their efficacy.

While the invention has been described in terms of a landfill environment, it is suitable for use in fixed-site operations in which sludge is dewatered on a batch basis in a fixed container with the solidified sludge being thereafter removed from the container to permit treatment of another batch, and as will described in connection with FIGS. 13–18, in a continuous dewatering process.

In practicing the invention, it has been found desirable to cut the slots 136 in the cathode pipe 134 relatively high and near the top of the cathode pipe to permit withdrawal of surface water from the pond. The surface water may result from either a natural settling of solids toward the bottom of the pond, leaving water near the top or from rainfall. In either instance, this practice permits the vacuum pumping system to draw water from the pond at faster rate and expedites the densification of solids in the pond. In addition, it has been found preferable to use a filter sock having a single layer rather than one made from multiple layers.

Experience thus far with practicing the invention also indicates that controlling the voltage drop and the current density between the respective anode and cathode electrodes to within certain ranges enhances the results obtained. Presently, it is believed that the voltage drop is preferably within a range of about 0.1 to about 0.7 volts per centimeter, while the current density should be in a range of about 300 to about 800 micro-amperes per square centimeter and, preferably, at about 750-micro-amperes per square centimeter. In addition, it is presently preferred that the pH of the sludge be in the range of about 6.5 to about 7.5, although the process has been applied successfully to substrates over the pH range 2.0 to 12.0.

The application of the techniques of the invention described in connection with FIGS. 1–12 to a continuous dewatering process is described in connection with FIGS. 13–18 hereinafter. An apparatus for continuously dewatering sludge is known and described in U.S. Pat. No. 4,244,804, which is herein incorporated by reference. The structure of that patent is thus similar to the structure of FIG. 13, to which the principles of this invention are applied to effect dewatering on a continuing basis.

In FIG. 13, an apparatus designated generally by the reference numeral 601 is depicted, partially in schematic form, for continuously dewatering sludges in the manner according to the invention heretofore disclosed in a rapid, cost-effective manner, in situ, to ease the burden of sludge handling and disposal or material reclamation. In FIG. 13, the sludge 603 is fed continuously from the discharge of the process which produces it (not shown) into the open top of a headbox 605. The apparatus includes a continuous upper filter belt 607 driven by a driving roller 609 and an idler roller 611. The anode 613 is disposed intermediate the rollers 609 and 611 and between the upper and lower webs of the filter belt 607. A lower filter belt 615 is similarly disposed about a driven roller 617 and an idler roller 619. A motor 621 is connected to a gear box 623 for controlling the rate of speed of the lower filter belt. The upper filter belt 607 is disposed relative to the lower belt 615 so that the opening at the inlet portion of the process (i.e. the space between the in-register portions of the belts 607 and 615) is slightly greater than that at the exit portion of the process because of the compaction of the sludges as a result of the process according to the invention. The sludge is discharged from the lower end of the headbox 605 onto the forward end of the lower filter belt 615 and is carried thereon into the electrokinetic dewatering zone defined, according to the invention heretofore described, between the anode 613 and cathode 625. Charged particles within the sludge, including macromolecules, colloids, and suspended particles, electrophoretically migrate to the oppositely charged counter electrode and consolidate, in the continuous process of FIG. 13, according to the same principles discussed in connection with FIGS. 1–12 above.

Filtration media, shown generally by the reference numeral 627, are located at the cathode 625 to permit the electro-osmotic removal of water from the sludge to encourage the dewatering of solids and densification of the sludge. The electrical energy applied to the electrodes is a chopped, time-varying, intermittent, unidirectional current, of the type heretofore described in FIGS. 9–12, or hereinafter described in FIG. 17, having a rapid rise edge which provides dewatering results comparable to prior methods which use direct current or full AC current but at substantially reduced energy consumption to provide more economical dewatering.

The dry sludge is discharged as a sludge cake 631 from the discharge end 632 of the process.

It is an additional advantage of the apparatus shown generally in FIG. 13 that it can be retrofitted on existing and conventional single belt or twin belt processes for transferring sludge in conventional sludge removal processes. In such a retrofit of the foregoing technology, a particularized specification for a specific installation can be developed taking into account the rate at which commercial sludges are processed in the presses of existing processes and the rate at which secondary sludge alone would be processed as an independent waste stream.

FIG. 14 shows a perspective view pilot unit for the application of the process described more generally in FIG. 13 for operating the process at a belt speed in the range of 1 to 18 feet per minute, at a vacuum of 0 to 10 inches of water, with a slit height at the inlet of 1½ to 6 inches and a slit height at the outlet of 0 to 2 inches.

In the apparatus of FIG. 14, an adjustable dam 635 (shown in expanded detail in FIG. 14B) is applied at the inlet to control the egress of the sludge and to obtain some measure of initial draining of liquids from the sludge fed by gravity at the feed pipe 637. In this respect, as shown by the detail in FIG. 14A, the headbox section 639 is divided into a formation zone 641, a draining zone 643, and a drying zone 645, in that order, according to the direction of belt travel, indicated by the arrow 647 in FIG. 14A.

The apparatus is disposed on a structural frame designated generally by the reference numeral 649, the details of which are not essential to the practice of the invention, and which may vary from installation to installation, particularly if the apparatus is retrofitted to an existing sludge removal system. As shown in the detail of FIG. 14C, the filter of the belt 653 includes a filter medium 651 on which is disposed the caked or caking sludge 655 disposed over a slotted drainage belt 653 supported by a guide member 656. A vacuum system shown generally the reference numeral 657 and in detail in FIG. 14D aids the removal of the permeate which passes through the filter 651 onto the support belt 653, which is preferably made of rubber. The support belt, as mentioned, is slotted in order to remove the permeate and distribute the vacuum across the underside of the filter fabric 651. While the apparatus of FIG. 14 is shown as a Straight Line Filter system, it can be used as the basis for the twin belt continuous system shown in FIG. 13 by the addition of the upper filter belt, as shown in FIG. 12, with conventional structural modifications of the frame 649. In this manner, it can be seen that a conventional Straight Line process can be readily adapted and thus retrofitted to the continuous dewatering apparatus of the invention. Such modification includes a support unit for the rear of the added upper belt to provide adjustable supports to permit the front and rear ends of the upper belt assembly to be raised and lowered independently to achieve the desired operating ranges.

FIG. 14E shows a filter washing system 661 for washing the filter fabric 651 by using a top washing spray device 663 and a bottom washing spray device 665. The remaining details of FIG. 14, such as tensioning adjustments, idler rolls, and the like, are conventional and thus known to one of ordinary skill in this art.

The anode assembly (see FIG. 13) includes insulating support members for supporting an anode section electrically connected, such as by graphite bars mounted in slots cut into the insulating supports and fastened by electrical connectors to carry power from a bus bar attached to the power unit in a conventional manner.

The cathode assembly (FIG. 13) for the continuous embodiment may alternatively include a plurality of conductive rods 675, such as aluminum mounted in transverse slots on the top of the rubber support belt 653 beneath the lower filter fabric 651 as shown in FIG. 14. The rods are mounted to protrude slightly from the side of the rubber belt, leaving a portion of each rod protruding from the belt and embedded in the rubber belt sufficiently to fix the rods firmly in place. Such a structure thus provides a porous cathode plate which allows water to be transported electrokinetically to the rubber belt with minimal interference for removal from the belt through the vacuum and filtration collection systems as previously described.

Because the process is continuous, a moving electrical contact assembly for the cathode, designated generally by the reference numeral 677 is shown in FIG. 16 and includes a stainless steel brush 679 which makes contact with the protruding rods 653 as they enter the dewatering zone. The fine wire bristles of the stainless steel brush 679 make an excellent conductor for receiving electrical currents applied thereto by a conductor (not shown) connected to the power supply system of FIGS. 9-12 or FIG. 17.

FIG. 17 is a circuit diagram suitable for supplying power in the form of an intermittant unidirectional current pulse 1UCP to the anode and cathode of either the batch process of the continuous process to establish an electric field through the sludge to be dewatered. The SCR circuit 200 is like that shown and discussed in detail in connection with FIG. 9, while the uni-junction circuit is like that shown and discussed in connection with FIG. 10. Therefore, like reference designations have been used to refer to like elements. In this embodiment, however, a transformer $T_1'$ has its secondary fully connected to a full wave bridge rectifier 701 and its primary connected to a source of AC power. Fuses F1 and F2 are provided between the secondary of the transformer $T_1'$ and the opposed legs of the input to the bridge rectifier 701.

The bridge 701 includes four diodes $CR_1'$-$CR_4'$ arranged to provide full wave rectification of the AC(ac) input signal TP, as shown by the wave form $TP_2$ in FIG. 18, taken at the output of the bridge. The firing of the uni-junction transistor Q1 is shown by the wave form $TP_3$ in FIG. 18 taken at the test point $TP_3$ in FIG. 17. As described in connection with FIGS. 9 and 11, whichever of the SCR's 206 and 208 has a positive anode voltage at the time of the gating pulse $TP_3$ occurs will fire to apply a voltage to the load for the remainder of that half cycle. The firing angle can thus be adjusted by the variable resistor R1 and capacitor C1 to vary from about 10° to about 180° or fully off.

The wave form applied to the anode in the dewatering zone is shown by $TP_4$ in FIG. 18. Fuses F3–F6 are interposed between the output of the power bridge 200 and the anodes through variable resistors R8–R11 to control the current flow at each anode.

Thus, an application of the techniques of the invention to a continuous dewatering system is shown in FIGS. 13–18.

FIG. 19 is a simplified block diagram of other electrokinetic processes to which the invention may be applied as set forth in the suggestions of this second continuation-in-part application. In particular, the application or any of the circuits shown in FIGS. 9, 10, 11, 12 or 17 with the wave forms of FIGS. 9A, 10A, 11A, 12 or 18 in the other electrokinetic processes depicted in FIG. 19 is expected to produce advantageous results as generally described in connection with electrophoretic dewatering.

In the first instance, the method for electrokinetically treating a liquid is not confined to the dewatering of sludges, slurries or the like, but may be applied for electrokinetically treating a liquid from a group consisting of emulsions, slurries, and solutions to achieve the advantages of the invention, namely to minimize electrode polarization and thereby maximize effective use of the applied power. The application of a time-varying, intermittent, unidirectional electrical current to a cathode and anode electrode within the liquid to be treated to establish an electrical field therebetween within the liquid wherein the electrical current wave form includes a switching edge at a selected phase angle to cause charged matter within the liquid to migrate to respective oppositely charged electrodes and continuing the process to complete the electrokinetic treatment is expected to achieve the advantages of the invention with a minimized consumption of power in carrying out other processes which heretofore may have used or required pulsed or intermittent direct current.

As is known, electrokinetic phenomena are associated with the movement of charged particles through a continuous medium or with the movement of a continuous medium over charged surfaces. The four principal electrokinetic phenomena are electrophoresis, electroosmosis, streaming potential, and sedimentation potential or Dorn effect, which phenomena are related to one another through the zeta potential of the electrical double layer which exists in the neighborhood of the charged surface. As was explained, the distribution of electrolyte ions in the neighborhood of a negatively charged surface and the variation of the potential with distance has been studied. Thus, among electrokinetic processes, these generalized types to which the invention may be implied includes electrodialysis processes, which includes electrolysis with membrane processes or bipolar membrane processes, desalinization and metathesis.

Electrolysis relates more generally to a method by which reactions are carried out in solutions of electrolytes or in molten salts by the use of electricity wherein one or several reactions occur at each electrode when current flows through the cell. For example, sodium is produced at the cathode by reduction and chlorine at the anode by oxidation in the electrolysis of molten sodium chloride. Other chemicals such as hydrogen, oxygen, hydrogen peroxide, chlorine, and sodium hydroxide are produced by electrolysis and water is enriched in deuterium oxide by electrolysis. Certain metals such as aluminum, magnesium, and sodium are produced by electrolysis of molten salt while fluorine is produced by oxidation of fluoride ions, and anhydrous hydrofluoric acid wherein electrolysis of the aquaeous solution of fluoride produces oxygen because this reaction occurs at lower anodic potentials than fluorine evolution.

The electrolysis of water to form hydrogen and oxygen is sometimes considered to be the simplest process for aqueous electrolytes. In addition, electrolytic processes are used in metallurgical applications for plating such metals as copper, cadmium, chromium, cobalt, gold, iron, lead, nickel, the platinium metals, silver, tin, and zinc, and alloys such as brass.

Electrolysis processes are also known which use ion permeable membranes or diaphragms which membranes may be cation permeable or anion permeable, as well as bipolar. Desalinization, or the purification of sea water to recover salt, is an example of a process using an ion permeable membrane cell. Non-aqueous solutes may also be used with electrolysis as well as fused salts. And, a typical example of metathesis is the reaction $CAOH_2 + 2NACL = CACL_2 + 2NAOH$.

The application of such a wave form to achieve the advantages of the invention is also expected to produce advantageous results in connection with the process of electrowinning, or electro-extraction. As is known, electrowinning or electro-extraction is the recovery of a metal from a solution of its salts by passing an electric current through the solution and is a common process for extracting metal from its ore.

Thirdly, the application of the techniques heretofore disclosed is also expected to be applicable to electrophoretic processes other than dewatering sludges and slurries and the like, such as the electrophoretic processes employed in the manufacture of polyvinyl acetate and polyvinyl chloride.

As can be appreciated by those skilled in the art, various changes and modifications can be made to the described embodiment of the present invention without departing from the spirit or scope of the invention as defined in the appended claims and their legal equivalents.

What is claimed is:

1. A method for electrokinetically treating a member selected from the group consisting of emulsions, slurries, and solutions for separating liquid from solids and so as to minimize and make effective use of the applied power comprising the steps of:

placing cathode and anode electrodes within the liquid to be treated;

applying a time-varying, intermittent, unidirectional electrical current of 60 to 120 pulses/second to the cathode and anode electrodes to establish an electric field of 0.1 to 0.7 volts/cm at a current density of 300 to 800 microamps/cm$^2$ of anode surface therebetween in said group member, the electrical current having a wave form which includes a switching edge at a selected phase angle of between 0° and 180° to cause charged matter within the liquid to migrate to respectively oppositely charged electrodes; and continuing the process to complete the electrokinetic treatment with a minimized consumption of power 0.02 to 0.041 kw hrs/gallon of liquid separated out.

2. The method as set forth in claim 1 wherein said first mentioned group member is derived from an electrodialysis process.

3. The method as set forth in claim 1 wherein said first mentioned group member is derived from an electrolysis process.

4. The method as set forth in claim 1 wherein said first mentioned group member is derived from an electrolysis process characterized as a membrane process.

5. The method set forth in claim 1 wherein said first mentioned group member is derived from an electrolysis process characterized as a bipolar membrane process.

6. The method as set forth in claim 1 wherein said first mentioned group member is derived from a desalinization process.

7. The method as set forth in claim 1 wherein said first mentioned group member is derived from a metathesis process.

8. The process as set forth in claim 1, wherein said first mentioned group member is derived from an electrowinning process.

9. A method according to claim 1, wherein said selected phase angle is between 10° and 180°.

10. A method according to claim 1, wherein said selected phase angle is 90°.

11. A method according to claim 1, wherein the current density is about 750 microamperes.

* * * * *